(12) United States Patent
Anderson et al.

(10) Patent No.: US 6,898,695 B2
(45) Date of Patent: May 24, 2005

(54) USE OF A FUTURE FILE FOR DATA ADDRESS CALCULATIONS IN A PIPELINED PROCESSOR

(75) Inventors: William C. Anderson, Austin, TX (US); Ryo Inoue, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 644 days.

(21) Appl. No.: 09/820,514

(22) Filed: Mar. 28, 2001

(65) Prior Publication Data

US 2002/0144089 A1 Oct. 3, 2002

(51) Int. Cl.[7] .................................................. G06F 9/00
(52) U.S. Cl. ...................................... 712/218; 712/219
(58) Field of Search ................................ 712/216, 217, 712/218, 219, 35, 211, 213

(56) References Cited

U.S. PATENT DOCUMENTS

| | | | | |
|---|---|---|---|---|
| 4,901,233 A | * | 2/1990 | Liptay ......................... 712/218 |
| 5,237,667 A | * | 8/1993 | Murakami et al. .......... 712/248 |
| RE34,850 E | * | 2/1995 | Murakami et al. ............ 712/33 |
| 5,944,810 A | * | 8/1999 | Cherabuddi ................... 712/23 |
| 6,633,970 B1 | * | 10/2003 | Clift et al. ................... 712/217 |
| 2002/0078326 A1 | * | 6/2002 | Roth et al. ................... 712/218 |

* cited by examiner

*Primary Examiner*—Henry W. H. Tsai
(74) *Attorney, Agent, or Firm*—Fish & Richardson P.C.

(57) ABSTRACT

In an embodiment, a pipelined processor includes a future file for storing updated data address values generated by a data address generator (DAG). These updated values may be provided to the DAG for subsequent address calculation operations.

22 Claims, 4 Drawing Sheets

USE OF A FUTURE FILE FOR DATA ADDRESS CALCULATIONS IN A PIPELINED PROCESSOR

BACKGROUND

A pipelined processor, such as a microprocessor for a personal computer or a digital signal processor, may include a data address generator (DAG) for generating speculative memory addresses for data which is transferred between memory and registers in the processor. In generating a data address, the DAG may update data address values used to calculate the data addresses. The updated data address values travel down the pipeline until they reach a write back (WB) stage, at which point they may be committed to an architectural file.

The DAG may use previously updated data address values that are still in the pipeline to generate a new data address. Some architectures include forwarding paths in each stage between the DAG, in an address calculation (AC) stage and the WB stage and utilize detection and multiplexing structures to locate and access the required updated values in the pipeline 102. Some problems associated with this type of architecture stem from the complexity of the logic required to detect data dependencies and to forward the appropriate operands to the execution units and increased power consumption due to the additional logic.

DETAILED DESCRIPTION

Figure 1:
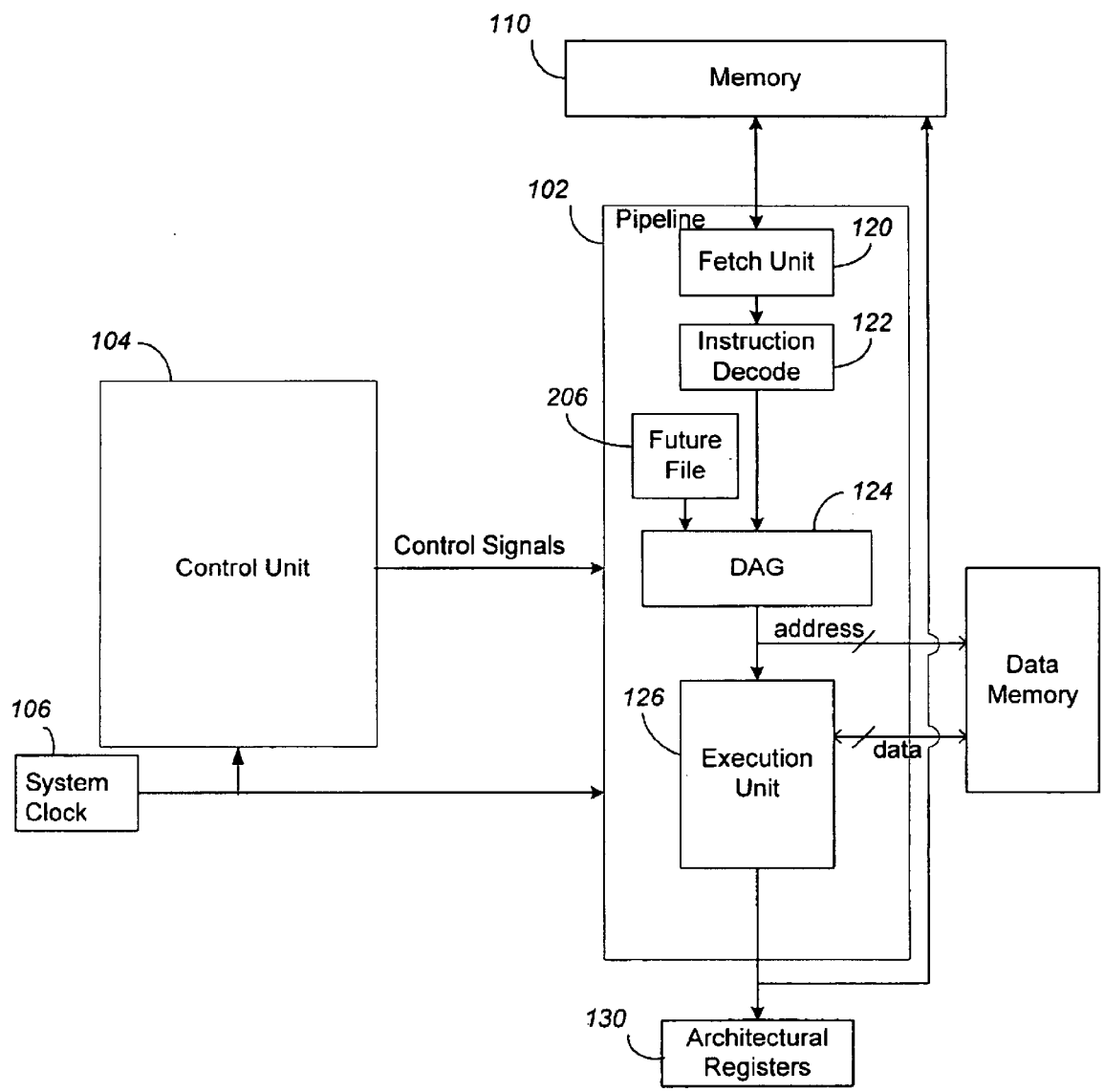
FIG. 1 is a block diagram of a processor including a future file according to an embodiment.

FIG. 1 is a block diagram illustrating a pipelined programmable processor 100, which includes a future file 206 for storing speculative data address values according to an embodiment. The processor 100 may include an execution pipeline 102 and a control unit 104. The control unit 104 may control the flow of instructions and data through the pipeline 102 in accordance with a system clock 106. During the processing of an instruction, the control unit 104 may direct the various components of the pipeline to decode the instruction and to perform the corresponding operation including, for example, writing results back to memory or registers.

Instructions may be loaded into a first stage of the pipeline 102 and be processed through subsequent stages. A stage may process concurrently with the other stages. Data may be passed between the stages in the pipeline 102 in accordance with the system clock signal. Instruction results may emerge at the end of the pipeline 102 in succession.

Figure 2:
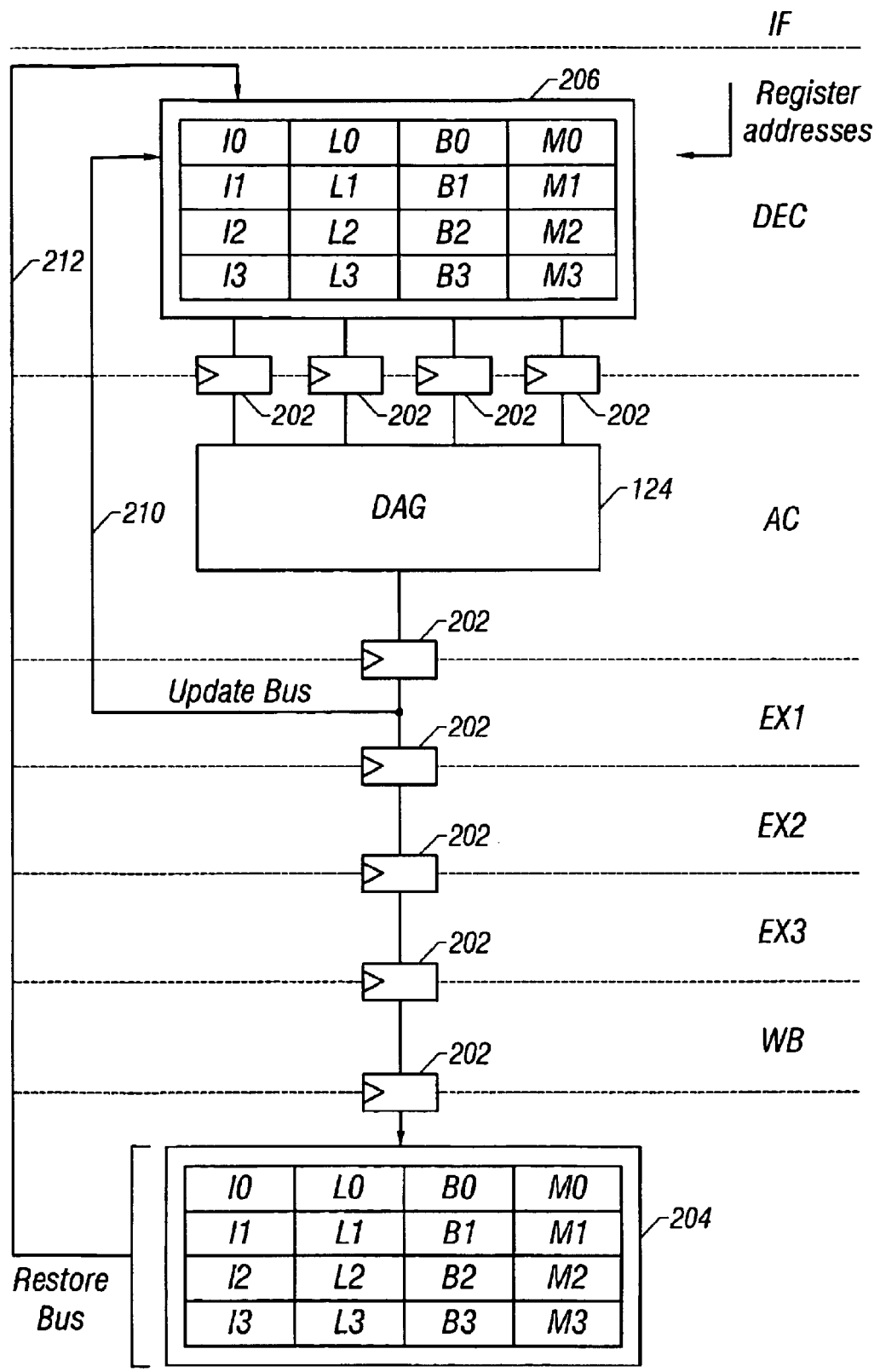
FIG. 2 is a block diagram of an execution pipeline according to an embodiment.

The pipeline 102 may include, for example, five stages: instruction fetch (IF), instruction decode (DEC), address calculation (AC), execute (EX), and write back (WB), as shown in FIG. 2. According to alternate embodiments, these stages may include sub-stages, e.g., the EX stage may include multiple sub-stages EX1, EX2, etc.

Instructions may be fetched from a memory device 110 such as, for example, a main memory or an instruction cache during the IF stage by a fetch unit 120 in a clock cycle. An instruction fetched in a clock cycle may be decoded in a subsequent clock cycle in the DEC stage by an instruction decode unit 122. The results may be passed to the AC stage, where a data address generator (DAG) 124 may calculate memory addresses for performing the operation. During the EX stage, an execution unit 126 may perform a specified operation such as, for example, adding or multiplying two numbers. The execution unit 126 may contain specialized hardware for performing the operations including, for example, one or more arithmetic logic units (ALUs), multiply and accumulate (MAC) units, and barrel shifters. A variety of data may be applied to the execution unit 126 such as the addresses generated by the DAG 124, data retrieved from memory or data retrieved from data registers. During the WB stage, the results may be written back to memory 110 or architectural registers 130.

The DAG 124 may generate speculative memory addresses for data which is transferred between memory and registers in the processor 100. The DAG 124 may employ different techniques to generate the data addresses, which include, for example, automatic incrementing and circular buffering. The DAG may operate on several values to calculate data addresses. These values may include the following: an index (I) value, which represents an address of data to be accessed; a length (L) value, which represents a length and may be used in circular buffering; a base (B) value, which represents a base address; and a modify (M) value, which may be used to post-modify an index value. The DAG 124 may update the index values in the AC stage when it generates a new data address, and may modify the other values when performing other DAG functions. The updated values exiting the AC stage may be latched in subsequent stage latches 202 (FIG. 2) as they flow down the pipeline 102 and may be written to an architectural file 204 upon reaching the WB stage. The architectural file 204 may include four sets of I, L, B, and M registers to store the updated values.

Generation of a data address may depend on a previously calculated address. In order to generate the data address, the DAG 124 may need to access an updated I, L, B, or M value that it calculated or modified in a previous cycle. However, this updated value may still be in the pipeline 102, and not yet committed to the architectural file 204.

In an embodiment, a future file 206 may be provided in the DEC stage. The future file acts as a working file and provides updated I, L, B, and M values to the DAG 124, located downstream in the AC stage. Like the architectural file 204, the future file 206 may include four sets each of I, L, B, and M registers.

Figure 3:
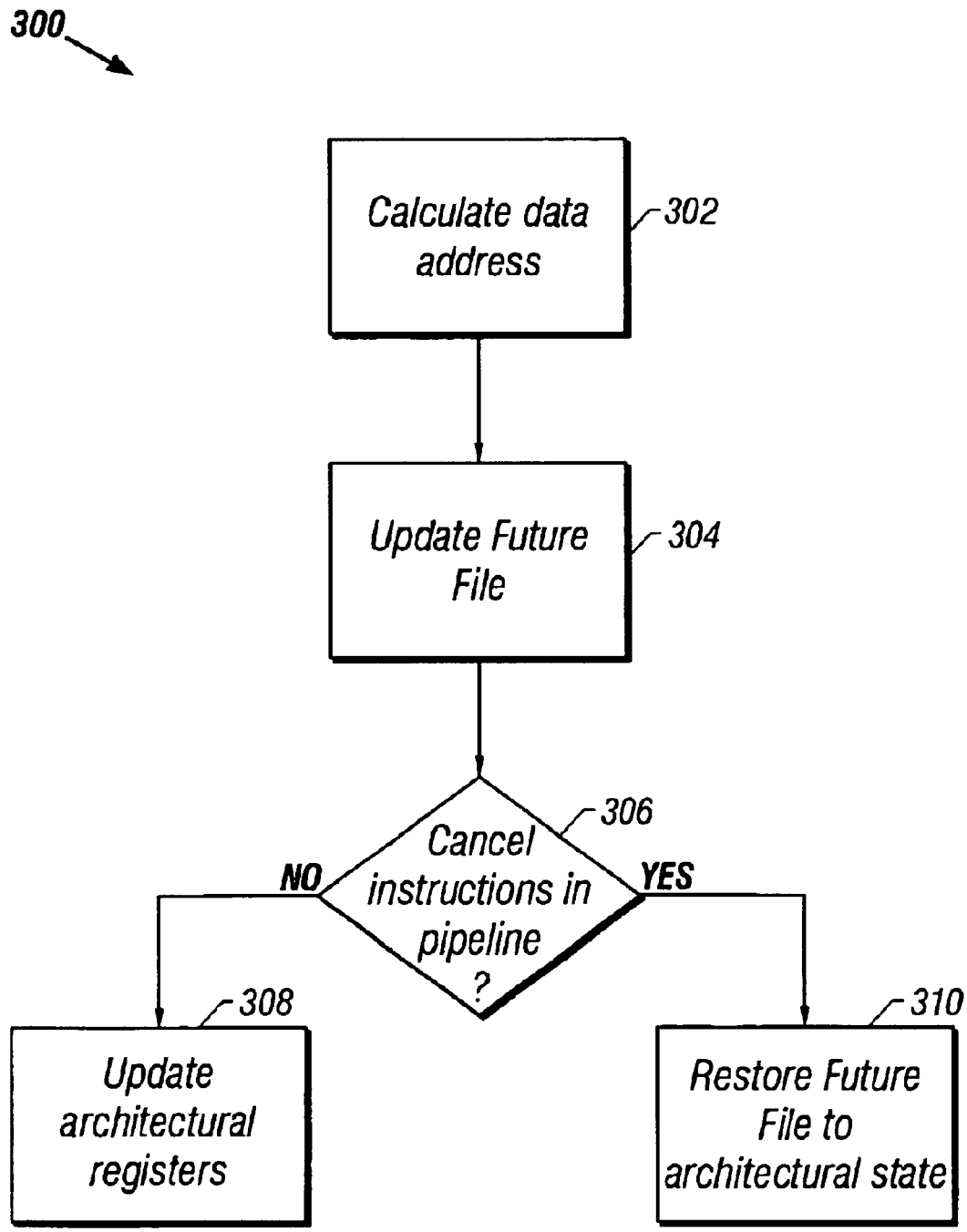
FIG. 3 is a flowchart describing an update operation according to an embodiment.

FIG. 3 is a flowchart illustrating an update operation 300 according to an embodiment. The flow of the operation described in FIG. 3 is exemplary, and blocks in the flowchart may be skipped or performed in different order and still produce desirable results. Updated values calculated in the AC stage in a clock cycle (block 302) exit the AC stage in the next cycle and are forwarded to the future file 206 via an update bus 210. During normal program flow, the future file is updated each cycle (block 304) to contain the last updated, i.e., most current, copies of the I, L, B, and M values calculated by the DAG 124. These copies are made available to the DAG 124 for subsequent calculations as the updated values travel down the pipeline 102.

The updated values stored in the future file 206 are speculative until their counterparts in the pipeline are committed to the architectural file 204. A speculative value may be rendered invalid if the instruction to which it corresponds is cancelled (i.e., "killed") (block 306). An instruction may be cancelled, and all writes turned off for that instruction, if it is no longer valid for the current program flow. This may occur, for example, when an interrupt is taken. When an interrupt occurs, all instructions in the pipeline 102 may be cancelled in response to a control signal from the control unit 104, and instructions from an interrupt service routine (ISR) may be fetched and introduced into the pipeline. The instructions may be cancelled, for example, by placing zeroes into the pipeline latches of the cancelled instructions. After the interrupt has been handled by the ISR, the program counter (PC), which tracks the program flow, may return to a cancelled instruction to resume the program flow. In other words, the pipeline rolls back to the state it had prior to fetching the cancelled instruction. This prior state is characterized by the committed values stored in the architectural file 204.

If the corresponding instruction is not cancelled, the updated (speculative) values continue down the pipeline 102 until they reach the WB stage, at which point they are committed to the architectural file 204 (block 308). If the corresponding instruction is cancelled, the processor 100 rolls back up to the prior state, described above, when the PC returns from the ISR. To facilitate this roll back, the values in the architectural file 204 may be copied to the future file 206 (block 310) via a restore bus 212, thereby overwriting the speculative updated values stored in the future file. When the program flow resumes, the future file 206 provides the DAG 124 with values which are valid for the current program flow. The future file may then be updated via the update bus 210 in subsequent clock cycles.

Such a processor 100 may be used in video camcorders, teleconferencing, PC video cards, and High-Definition Television (HDTV). In addition, the processor 100 may be used in connection with other technologies utilizing digital signal processing such as voice processing used in mobile telephony, speech recognition, and other applications.

Figure 4:
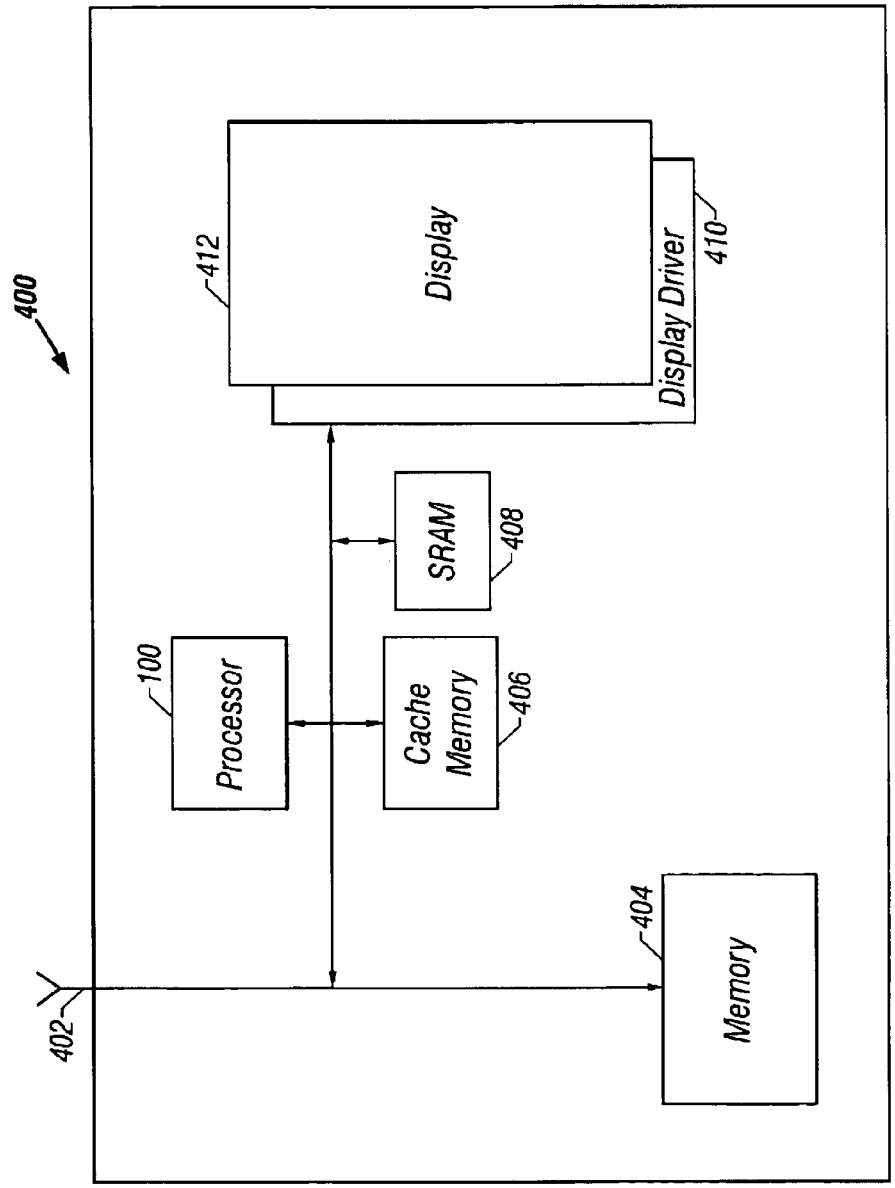
FIG. 4 is a block diagram of a mobile video unit including a processor according to an embodiment.

For example, FIG. 4 illustrates a mobile video device 400 including a processor 100 according to an embodiment. The mobile video device 400 may be a hand-held device which displays video images produced from an encoded video signal received from an antenna 402 or a digital video storage medium 404, e.g., a digital video disc (DVD) or a memory card. The processor 100 may communicate with a cache memory 406, which may store instructions and data for the processor operations, and other devices, for example, a static random access memory (SRAM) 408.

The processor 100 may be a microprocessor, a digital signal processor (DSP), a microprocessor controlling a slave DSP, or a processor with a hybrid microprocessor/DSP architecture. The processor 100 may perform various operations on the encoded video signal, including, for example, analog-to-digital conversion, demodulation, filtering, data recovery, and decoding. The processor 100 may decode the compressed digital video signal according to one of various digital video compression standards such as the MPEG-family of standards and the H.263 standard. The decoded video signal may then be input to a display driver 410 to produce the video image on a display 412.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in a pipelined processor including a pipeline having a plurality of stages, the method comprising:
storing a first updated data address value in a future file;
generating a second updated data address value from said first updated data address value;
updating the future file with the second updated data address value without terminating an instruction associated with the second updated data address value in the pipeline; and
storing a committed data address value in an architectural file.

2. The method of claim 1, further comprising:
cancelling an instruction in the pipeline; and
restoring the future file to a valid state by writing the committed data address value in the architectural file to the future file.

3. The method of claim 1, wherein generating the second updated data address value comprises calculating the second updated data address value with a data address generator in an address calculation stage of the pipeline.

4. The method of claim 1, further comprising providing the future file in a decode stage of the pipeline.

5. The method of claim 1, wherein storing the first updated data address value comprises storing at least one of an index value, a length value, a base value, and a modify value in the future file.

6. An article comprising a machine-readable medium which stores machine-executable instructions, the instructions causing a machine to:
store a first data address value in a future file;
generate a second updated data address value from said first data address value;
update the future file with the second updated data address value without terminating an instruction associated with the second updated data address value in a pipeline; and
store a committed data address value in an architectural file.

7. The article of claim 6, further comprising instructions which cause the machine to:
cancel an instruction in the pipeline; and
restore the future file to a valid state by writing the committed data address value in the architectural file to the future file.

8. The article of claim 6, wherein the instructions which cause the machine to generate the second updated data address value comprise instructions which cause the machine to calculate the second updated data address value with a data address generator in an address calculation stage of the pipeline.

9. The article of claim 6, further comprising instructions which cause the machine to provide the future file in a decode stage of the pipeline.

10. The article of claim 6, wherein the instructions which cause the machine to store the first data address value comprise instructions which cause the machine to store at least one of an index value, a length value, a base value, and a modify value in the future file.

11. A processor comprising:
a pipeline comprising two or more stages;
a future file operative to store one or more data address values;
a data address generator operative to generate an updated data address value from one or more of said data address values;

an update bus connected between the data address generator and the future file and operative to write the updated data address value to the future file without terminating an instruction associated with the updated data address value in the pipeline; and an architectural file operative to store committed data addresses values.

12. The processor of claim 11, wherein said two or more stages include a decode stage, an address calculation stage, an execution stage, and a write back stage.

13. The processor of claim 12, wherein the future file is located in the decode stage and the data address generator is located in the address calculation stage.

14. The processor of claim 11, further comprising a restore bus connected between the architectural file and the future file; and a control unit operative to write the committed data address values from the architectural file to the future file via the restore bus in response to the pipeline being cancelled.

15. The processor of claim 11, wherein the updated data address value includes at least one of an index value, a length value, a base value, and a modify value.

16. The processor of claim 11, wherein the processor comprises a digital signal processor.

17. A system comprising:

a static random access memory; and a processor coupled to the static random access memory and including a pipeline comprising two or more stages, a future file operative to store one or more data address values, a data address generator operative to generate an updated data address value from one or more of said data address values;

an update bus connected between the data address generator and the future file and operative to write the updated data address value to the future file without terminating an instruction associated with the updated data address value in the pipeline; and an architectural file operative to store committed data addresses values.

18. The system of claim 17, wherein said two or more stages include a decode stage, an address calculation stage, an execution stage, and a write back stage.

19. The system of claim 18, wherein the future file is located in the decode stage and the data address generator is located in the address calculation stage.

20. The system of claim 17, further comprising a restore bus connected between the architectural file and the future file; and a control unit operative to write the committed data address values from the architectural file to the future file via the restore bus in response to the pending pipeline instructions being cancelled.

21. The system of claim 17, wherein the updated data address value includes at least one of an index value, a length value, a base value, and a modify value.

22. The system of claim 17, wherein the processor comprises a digital signal processor.

* * * * *